US009436533B2

(12) United States Patent
Hermany et al.

(10) Patent No.: US 9,436,533 B2
(45) Date of Patent: Sep. 6, 2016

(54) SYSTEM FOR MONITORING AND TRACKING APPLICATION CRASHES OCCURRING ON DIFFERENT MOBILE DEVICES

(71) Applicant: Apteligent, Inc., San Francisco, CA (US)

(72) Inventors: Sean Hermany, Salt Lake City, UT (US); Paul Lappas, San Francisco, CA (US); Andrew Levy, San Francisco, CA (US); Robert Kwok, San Francisco, CA (US); Andrew Yousef, San Francisco, CA (US); Kevin Su, San Francisco, CA (US); Keith Dreibelbis, San Francisco, CA (US)

(73) Assignee: APTELIGENT, INC., San Francisco, CA (US)

( * ) Notice: Subject to any disclaimer, the term of this patent is extended or adjusted under 35 U.S.C. 154(b) by 87 days.

(21) Appl. No.: 14/295,283

(22) Filed: Jun. 3, 2014

(65) Prior Publication Data

US 2015/0347220 A1 Dec. 3, 2015

Related U.S. Application Data

(60) Provisional application No. 62/005,951, filed on May 30, 2014.

(51) Int. Cl.
*G06F 11/00* (2006.01)
*G06F 11/07* (2006.01)
*G06F 11/36* (2006.01)

(52) U.S. Cl.
CPC ....... *G06F 11/0742* (2013.01); *G06F 11/0748* (2013.01); *G06F 11/0769* (2013.01); *G06F 11/0778* (2013.01); *G06F 11/0787* (2013.01); *G06F 11/366* (2013.01)

(58) Field of Classification Search
CPC .......... G06F 11/0742; G06F 11/0778; G06F 11/0787; G06F 11/079; G06F 11/366
See application file for complete search history.

(56) References Cited

U.S. PATENT DOCUMENTS

| 7,577,879 | B2  |   | 8/2009 | Lantz et al. |             |
|-----------|-----|---|--------|--------------|-------------|
| 7,739,551 | B2  | * | 6/2010 | Eickmeyer    | G06F 11/0709 |
|           |     |   |        |              | 714/38.1    |
| 7,966,522 | B2  | * | 6/2011 | Fabbrocino   | G06F 11/0793 |
|           |     |   |        |              | 714/26      |
| 8,453,027 | B2  | * | 5/2013 | Bartz        | G06F 11/0709 |
|           |     |   |        |              | 714/746     |
| 8,516,308 | B1  | * | 8/2013 | Gill         | H04L 67/34  |
|           |     |   |        |              | 714/26      |
| 8,726,092 | B1  | * | 5/2014 | Gray         | G06F 11/0706 |
|           |     |   |        |              | 714/38.1    |

(Continued)

OTHER PUBLICATIONS

Author Unknown, "PonyDebugger," month unknown, 2013, 9 pages, available at http://web.archive.org/web/20130901043356/https://github.com/square/PonyDebugger.

(Continued)

*Primary Examiner* — Joseph Kudirka
(74) *Attorney, Agent, or Firm* — Adeli LLP

(57) ABSTRACT

Some embodiments provide a system that allows application developers to track and monitor crashes that are occurring with their applications on various mobile devices. In some embodiments, the system includes an application programming interface (API) server that receives crash reports with raw crash data from the mobile devices and facilitates in assigning each crash report to one of several different crash processing servers. The crash processing server of some embodiments receives the raw crash data and translates obscure data in the raw crash data into a human or developer readable form.

20 Claims, 15 Drawing Sheets

(56) References Cited

U.S. PATENT DOCUMENTS

| | | | |
|---|---|---|---|
| 8,861,360 B2 | 10/2014 | Chang et al. | |
| 8,898,637 B2 | 11/2014 | Surazski et al. | |
| 9,104,797 B1* | 8/2015 | Sekhar | G06F 11/362 |
| 2004/0068560 A1 | 4/2004 | Oulu et al. | |
| 2006/0218533 A1 | 9/2006 | Koduru et al. | |
| 2011/0196761 A1 | 8/2011 | Callahan et al. | |
| 2011/0314438 A1* | 12/2011 | Surazski | G06F 11/0742 717/100 |
| 2012/0023475 A1 | 1/2012 | Surazski et al. | |
| 2012/0151278 A1* | 6/2012 | Tsantilis | G06F 11/366 714/48 |
| 2014/0024348 A1 | 1/2014 | Hurst et al. | |
| 2014/0113588 A1 | 4/2014 | Chekina et al. | |
| 2015/0227404 A1* | 8/2015 | Rajagopal | G06F 11/079 714/37 |

OTHER PUBLICATIONS

Author Unknown, "Real time symbolication," Nov. 4, 2013, 4 pages, TestFlight, available at https://web.archive.org/web/20131104125744/http:/blog.testflightapp.com/post/11322114068/real-time-symbolication.

PCT/US2015/053861, Oct. 2, 2015 (filing date), Crittercism, Inc.

International Search Report and Written Opinion for PCT/US2015/053861, Jan. 4, 2016 (mailing date), Crittercism, Inc.

* cited by examiner

SYSTEM FOR MONITORING AND TRACKING APPLICATION CRASHES OCCURRING ON DIFFERENT MOBILE DEVICES

CLAIM OF BENEFIT TO PRIOR APPLICATIONS

This application claims the benefit of U.S. Provisional Patent Application 62/005,951, entitled "System for Monitoring and Tracking Application Crashes Occurring on Different Mobile Devices", filed May 30, 2014. U.S. Provisional Patent Application 62/005,951 is incorporated herein by reference.

BACKGROUND

The mobile device industry has been growing for a number of years. The growth in the industry has led to a proliferation of many different types of mobile devices from various different vendors. With the growth, there is an increasing demand for quality applications. Many application developers rely on user feedback to determine if there are any issues (e.g., crash issues) with their applications. Such user feedback may be valuable, but it may not provide the developers with real-time data relating to an application crash. The user feedback may also not provide (e.g., at least in real-time and with minimum effort) if the same crash is an isolated case or is occurring across a number of mobile devices.

BRIEF SUMMARY

Some embodiments provide a system that allows application developers to track and monitor crashes that are occurring with their applications on various mobile devices. In some embodiments, the system includes an application programing interface (API) server that receives crash logs from the mobile devices and facilitates in assigning each crash log to one of several different crash processing servers. The crash processing server of some embodiments receives the raw crash data in a crash log and translates obscure data in the raw crash data into a human or developer readable form in order to present a crash report to an application developer. As an example, the crash processor may symbolicate or de-obfuscate the raw crash data and generate a translated version of the raw crash data.

In some embodiments, the API server facilitates in assigning each crash log to one of several different crash processors by adding the crash log to a task queue. The task queue of some embodiments is implemented by a message queue bus. The message queue bus of some embodiments is a software component of the system that distributes each crash log to an available crash processor. The message queue bus may distribute the work in sequence to the next available crash processor following a round robin dispatching scheme. In some embodiments, the message queue bus assigns the crash reports to different crash processors following the competing consumers design pattern.

The crash processor of some embodiments generates a hash code using the crash log. In some embodiments, the hash code is used to determine a total occurrence of the same crash as the one specified in the crash log. In generating the hash code, the crash processor may use all code line items in the stack trace. This is because, typically, the information leading up to a crash can be just as important as identifying a particular method call invocation (e.g., a first code line item) that resulted in the crash. The crash processor of some embodiments generates the hash code by using one or more additional pieces of crash metadata specified in the crash log, such as the reason for the crash.

In some embodiments, the system includes at least two tiers of crash processors. In some embodiments, a first tier crash processor performs a first level symbolication operation on a crash log to provide one or more symbol names for methods that are mobile OS specific, and a second tier crash processor performs a second level symbolication operation on the crash log to provide one or more symbol names for methods that are application specific. The first tier crash processor may perform the first level symbolication operation using a custom map file. In some embodiments, the custom map file provides mapping for a set of symbol names for a set of OS specific methods that are redacted. In some embodiments, the second tier crash processor performs the second level symbolication operation only if an application symbol map is accessible in a storage.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features as described here are set forth in the appended claims. However, for purposes of explanation, several embodiments are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Embodiments described herein provide a system that allows application developers to track and monitor crashes that are occurring with their applications on various mobile devices. In some embodiments, the system includes an application programing interface (API) server that receives crash logs from the mobile devices and facilitates in assigning each crash log to one of several different crash processing servers. The crash processing server of some embodiments receives the raw crash data in a crash log and translates obscure data in the raw crash data into a human or developer readable form in order to present a crash report to an application developer. As an example, the crash processor may symbolicate or de-obfuscate the raw crash data and generate a translated version of the raw crash data.

Figure 1:
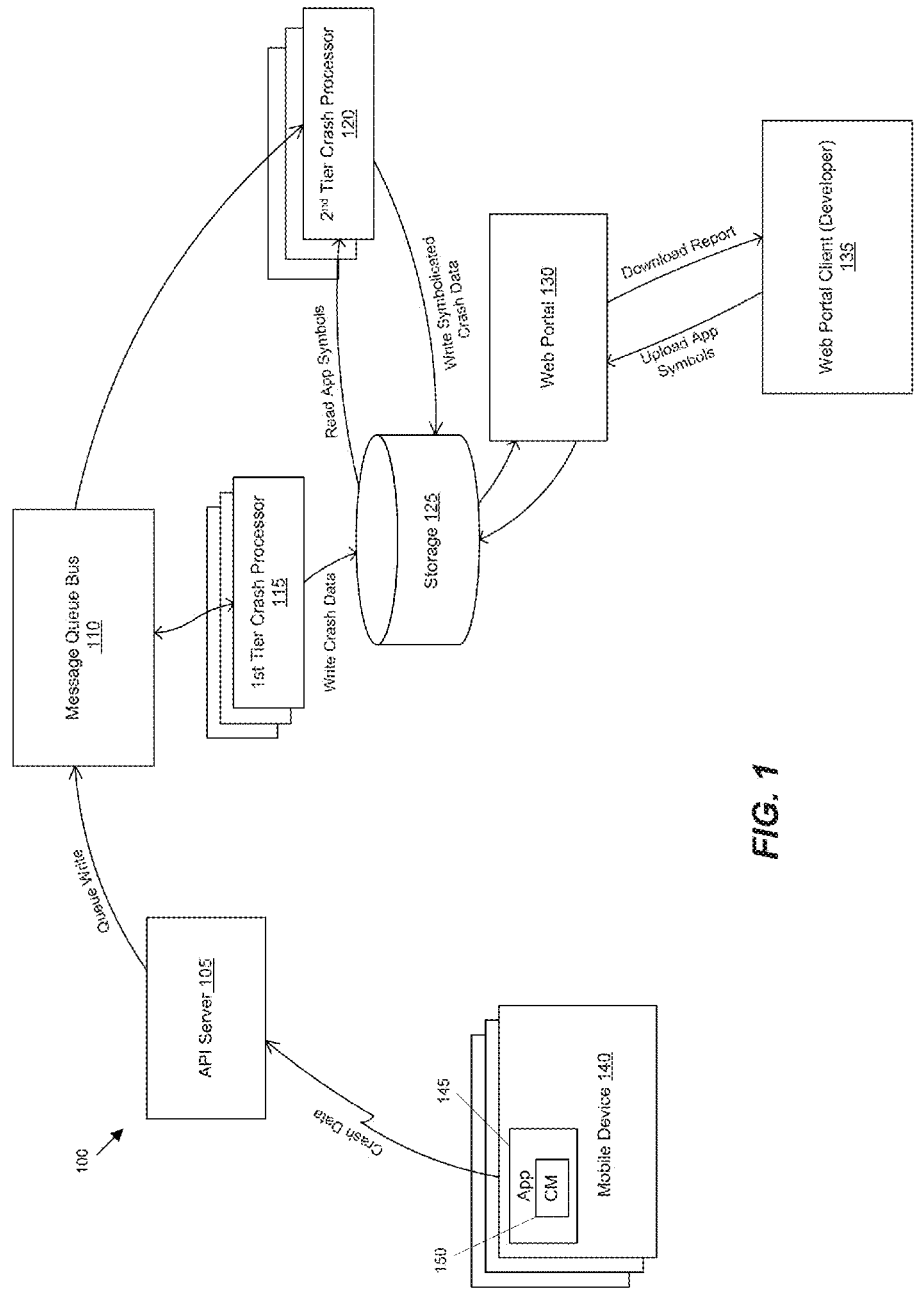
FIG. 1 conceptually illustrates a system for tracking and monitoring application crashes on different mobile devices.

For some embodiments of the inventions, FIG. 1 conceptually illustrates a system 100 for tracking and monitoring application crashes occurring on different mobile devices. Specifically, this figure shows the system 100 receiving crash reports from several mobile devices, processing each crash report, and presenting one or more different reports (e.g., crash reports) to an application developer. As shown, the system 100 includes an API server 105, a message queue bus 110, storage 125, a web portal 130, and several tiers of crash processing engines 115 and 120. In addition, each mobile device 140 includes an application 145 with a crash monitor 150.

In the example of FIG. 1, the mobile device 140 can be any mobile device that runs a mobile operating system (OS). Examples of different types of mobile devices include a smart phone, a tablet, a smart watch, a phablet, etc. Examples of different types of mobile OSs include iOS® by Apple Inc., Android™ OS by Google Inc., Windows Phone®, etc. In some embodiments, the system 100 processes crashes that occur on other types of electronic devices, such as a digital media player appliance, a game system, a smart television (TV), a smart appliance, desktop computer, laptop, etc.

In some embodiments, the application 145 can be a native application, a carrier-based application, or a third-party application. The crash monitor 150 of some embodiments runs on the mobile device to detect and report application crashes. For instance, when a crash occur, the crash monitor may detect that the crash has occurred and save data relating to the crash in order to send a crash report to the API server. In some embodiments, a crash is an unhandled exception. Different from a handled exception, an unhandled exception is an error in an execution thread that the application could not could not catch and handle. Typically, when a crash occurs, the application dies or closes because it could not catch and handle the crash.

In some embodiments, the crash monitor 150 is a tool provided by a mobile application performance management (mAPM) solution provider that runs in conjunction with the application 145 to detect and report crashes. In some embodiments, the crash monitor saves a crash log each time the application crashes. The crash log is then sent to the API server so that the crash log can be processed by one or more crash processors. The crash log may include a stack trace of code. Typically, such a stack trace shows a sequence of method calls that were made by the application leading up to the crash. The crash log may also include other data, such as information regarding a thread that crashed, a type of exception, a reason for the crash, etc.

The API server 105 of some embodiments receives crash reports from various mobile devices and initiates the distribution of the processing of each crash report to one or more crash processors 115 and 120. In some embodiments, when a crash report is received from the mobile device 140, the API server 105 enqueues the crash report as a task in a task queue. The task is then retrieved from the task queue and assigned to an available crash processor. The crash processor 115 may process a stack trace of code, and if necessary, enqueue another task (e.g., in the task queue) if the stack trace require further processing by another crash processor 120.

In some embodiments, the task queue is implemented by the message queue bus 110. The message queue bus 110 is a software component of the system 100 that distributes the processing of the crash reports to different crash processors 115 and 120. The message queue bus 110 may distribute the work in sequence to the next available crash processor following a round robin dispatching scheme. Alternatively, the message queue bus may distribute the work using some other dispatching scheme. In some embodiments, the message queue bus assigns the crash reports to different crash processors following the competing consumers design pattern. If the design pattern is followed, the competing consumers are the tiers of crash processors 115 and 120 that are competing for tasks that are stored with the message queue bus. The message queue bus 1110 of some embodiments is implemented using an open sources messaging system, such as RabbitMQ™. In some embodiments, the message queue bus 110 is implemented on the API server 105. Alternatively, the message queue bus 110 may be provided in a separate message queue bus server.

As shown in FIG. 1, the system of some embodiments can include several tiers of crash processors 115 and 120. Each tier can include one more crash processors. The number of crash processors in each tier can change depending on the load. For instance, the system can be scaled by adding new crash processors or de-scaled by removing existing crash processors. In some embodiments, each crash processor is a software component that runs on a particular server. Each crash processor may run on a separate server from each other crash processor, in some embodiments.

In some embodiments, the first tier crash processor 115 receives a crash report from the message queue bus 110 and processes the crash report. In some embodiments, the crash processor 115 reads the crash report to write data relating to the crash to storage 125. For instance, the crash processor may read the crash report to extract raw crash data and crash metadata. The crash processor of some embodiments translates raw crash data into a more human or developer readable form, and stores a translated version of the raw crash data in storage. In generating the translated version, the crash processor of some embodiments use a map (e.g., a custom OS symbol file) to translate obscure memory addresses into symbol names (e.g., method names). In some embodiments, the first tier crash processor symbolicates a stack trace by replacing memory addresses with symbol names of methods that are not specific to the application. In other words, the first tier crash processor may replace memory addresses for methods of one or more different available libraries or APIs that were used to code the application.

When a crash log is received, the first tier crash processor 115 of some embodiments identifies the crash specified in the crash log. In some embodiment, the crash is identified to provide an application developer with statistics regarding the crash. For instance, the system may provide a total occurrence of the same crash. The total occurrence can be across all mobile devices, across different versions of the same mobile OS, across one version of the same OS, etc. In some embodiments, the first tier crash processor 115 uses one or more lines in a stack trace of code to classify the crash. As an example, the crash processor may generate a hash code based on all code line items in the stack trace. The crash processor may also use other data (e.g., the reason for the crash) in the stack trace to generate the hash code.

The first tier crash processor 115 of some embodiments determines whether the crash data should be processed by one of the second tier crash processors. If so, the first tier crash processor may pass the crash data to the second tier crash processor. In some embodiments, the first tier crash processor provides the crash data to the second tier crash processor using a task queue. The task queue may be the same one managed by the message queue bus. For instance, when it is determined that the crash data should be processed by a second tier crash processor, the first tier crash process may enqueue a new task with the message queue bus 110. The message queue bus then assigns the task to an available second tier crash processor 120.

In some embodiments, the second tier crash processor 120 performs a mapping operation that is similar to the one performed by the first tier crash processor 115. However, the second tier crash processor 120 may use a different map (e.g., an application symbol file) to translate obscure memory addresses into symbol names (e.g., function names, method names) and store the translated version in storage 125. In some embodiments, the second tier crash processor 120 performs a translation by reading an obfuscation map to de-obfuscate the obfuscated code in a stack trace.

The storage 125 stores crash data (e.g., raw crash data, processed crash data, crash metadata). To simplify the description, only one storage is shown in FIG. 1. However, the crash data may be stored in a number of storages (e.g., databases). In addition, the data may be stored at different locations (e.g., at different data centers). The data may also be accessed using standard Structured Query Language (SQL), using a NoSQL mechanism, or using some other data access protocol.

The web portal 130 provides one or more different crash reports to a web portal client 135. Based on the crash data in storage 125, the web portal 130 of some embodiments generates a real-time global view of application diagnostics and crashes across different mobile device platforms (e.g., iOS, Android, Windows Phone®, etc.). The web portal may format and/or translates the crash data in some manner to present it to developers. For example, the captured data may be presented in statistical and/or in graphical format. Such a format allows developers to easily track (e.g., in real-time) crashes that are occurring on one or more of their applications across different types of mobile devices, mobile OSs, application versions, etc. This is important because the developers do not have to wait for user feedback. Instead, they can access one or more of the different reports and prioritize their work in order to address the application crashes.

In some embodiments, the web portal 130 generates different views with trends associated with the monitored applications. Trending represents tracking captured data over some period of time to detect and diagnose changes in the application's performance. The trends can be over different types of data. For instance, the API server of some embodiments allows developers to track real-time and historical performance across device, OS, versions, etc. The API server may allow developers to view trends by device, OS, and carrier. For developers, such trends can be important from a business perspective as well as a technical perspective. From a business perspective, the trends allow the developers to know which device (e.g., make and/or model), OS (e.g., version), and/or carrier is the most popular. From a technical perspective, the trends allow the developers to know which device, OS, and/or carrier is the most problematic across the developer's user base.

The web portal client 135 is used to download crash reports and present them to an application developer. In some embodiments, the web portal client 135 can also be used to upload a map (e.g., application symbol file) to store in storage 125. The second tier crash processor may use such a map to symbolicate or de-obfuscate a stack trace, and store the processed version in storage 125. In the example of FIG. 1, the web portal client 135 is a standard web browser that accesses the web portal 130. The web portal 130 delivers web pages to the clients. The web portal 130 might send, to the client, one or more pages with crash reports, device trends, OS trends, carrier trends, etc. In some embodiment, the crash data can be accessed via a stand-alone application, or any other distributed software application or service. For instance, instead of a thin client, the system 100 may provider a thick client application to access the crash data in storage 125.

While many of the features of the system 100 have been described as being performed by one component (e.g., the API server 105, the message queue bus 110, etc.), one of ordinary skill in the art will recognize that the functions of such components and other components described herein might be split up into multiple sub-components. Similarly, functions described as being performed by multiple different components (a first tier crash processor and a second tier crash processor) might be performed by a single component (a combined first and second tier crash processor), in some embodiments.

Many examples of operations of the crash monitoring system are described below. Specifically, Section I describes examples operations performed by the system to detect and report crashes. This is followed by Section II, which describes how the system of some embodiments distributes crash logs to different crash processors. Section III then describes example operations of several different crash processors. Next, Section IV then describes an example data structure used to implement some embodiments of the invention. Section V then describes an example crash report.

Finally, Section VI describes electronic systems for implementing some embodiments of the invention.

I. Detecting and Reporting Crashes

Figure 2A:
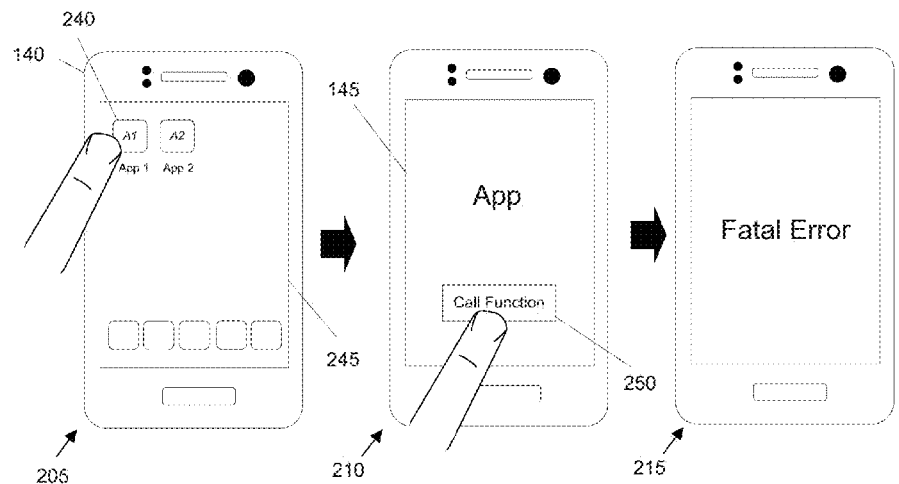
FIG. 2A conceptually shows an example user interaction with a mobile device that causes an application to crash.
Figure 2B:
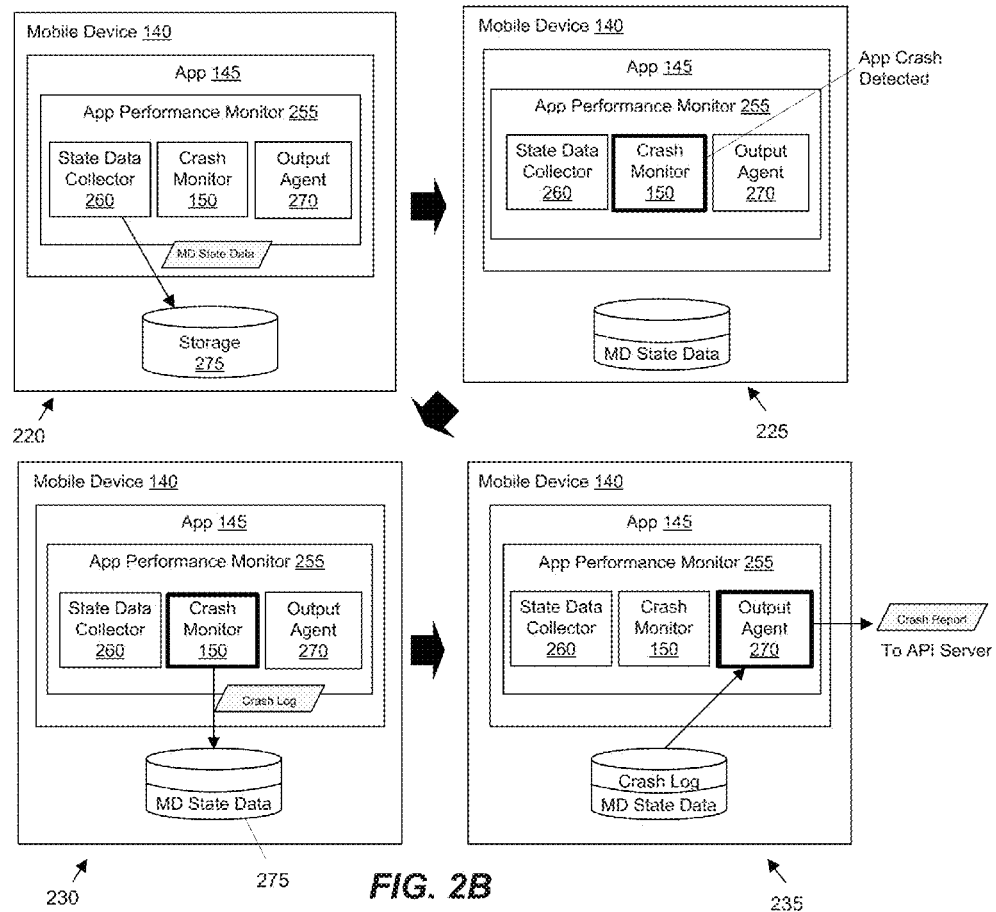
FIG. 2B shows an example of detecting an application crash and reporting the crash to a crash monitoring server.

In some embodiments, the crash monitor operates in conjunction with an application to detect and report application crashes to an API server. FIG. 2 illustrates an example of detecting an application crash and reporting the crash to the API server. Specifically, FIG. 2A conceptually shows an example user interaction with a mobile device 140 that causes an application 145 to crash. This followed by FIG. 2B, which illustrates the same mobile device 140 from the perspective of a crash monitor.

FIG. 2A shows a person interacting with the application 145 executing on the mobile device 140. In this example, as well as many other examples below, the mobile device is a smart phone. However, one of ordinary skill in the art will understand that the discussion in this example as well as other examples discussed hereinafter is equally applicable to other kinds of mobile devices (e.g., a tablet, a smart watch, etc.) or any other electronic devices (e.g., a digital media player appliance, a game system, etc.).

Three operational stages 205-215 of the mobile device 140 are shown in FIG. 2A. The first stage 205 shows the mobile device 140 showing a home screen page 245 on the device's touch-screen display. The home screen page 245 includes a number of icons, several of which are arranged along the bottom of the screen (e.g., in a dock). Each icon can be selected to open a corresponding application. Here, the user taps the user's finger over an icon 240 associated with the application. The gesture causes the application 145 to be opened, as illustrated in the second stage 210.

The second stage 210 conceptually shows the application 145 being directed to make a method call. In particular, the user interacts with the application 145 by tapping the user's finger over a selectable item 250. The third stage 215 illustrates the mobile device 140 after making the user's selection of the selectable item 250. This stage shows that the function call resulted in the application crashing for some reason.

FIG. 2B illustrates the crash monitor detecting a crash and saving a crash log. Four operational stages 220-235 of the same mobile device 140 are shown in the figure. Several of these stages 220-235 represent operations that are occurring as the user interacts with the application 145 in stages 205-215 of FIG. 2A.

As shown in FIG. 2B, the application 145 executes on the mobile device 140. In this example, the crash monitor 150 is part of an application performance monitor 255. In addition to the crash monitor, the application performance monitor 255 includes a mobile state data collector 260 and output agent 270.

In some embodiments, the mobile device state data collector 260 aggregates state data relating to the mobile device. The mobile state data is sent along with a crash log to the API server, in some embodiments. The mobile state data provides context regarding the crash. In other words, the mobile state data identifies the state of the mobile device when the crash occurred. In some embodiments, the mobile device updates the aggregated data each time there is a change in the state of the mobile device. Examples of different mobile state data include carrier info (e.g., the name or identity of the wireless carrier that is servicing the mobile device), geo location information (e.g., latitude, longitude), network connectivity information (e.g., whether the device was on Wi-Fi, cellular, or not connected), etc.

The output agent 270 is responsible for sending each crash report to the API server. The output agent 270 may send the report immediately upon detecting a crash or may send the data when triggered. For instance, the data may be sent on a periodic basis. The frequency of this period may be set by the API server. If the application closes due to the crash, the output agent may send the crash report when the application is reopened.

Having described several example components, the operations of the mobile device 140 will now be described in terms of the four stages 220-235 that are illustrated in FIG. 2B. The first stage 220 illustrates the mobile device state data collector 260 gathering the latest mobile state data and storing it in storage 275. The mobile device state data collector may initially gather the data when the application is opened, and may continue updating the data while the application is opened. For instance, if network connectivity changes, the mobile device state data collector may be informed of the change and update the state data in the storage. In this manner, when a crash log is captured, the crash log is associated with the latest state that is stored in the storage.

The second stage 225 illustrates the crash monitor 150 detecting a crash. This stage corresponds to a point in time after the user has initiated the function call by tapping the user's finger over the selectable item 250 in the second stage 210 of FIG. 2A. The third stage 230 shows the crash monitor 150 storing data relating to the crash in storage 275. Particularly, the crash monitor has detected the crash, captured a crash log, and stored the crash log in the storage 275.

The fourth stage 235 shows the output agent sending a crash report to the API server. In sending, the output agent 270 may retrieve the crash data from the storage, which includes the crash log and the mobile state data, and send the crash data in a message to the API server. The output agent may interface with one or more other components to encrypt the data prior to sending the data to the API server.

II. Distributing Tasks

As mentioned above, the system includes an application programing interface (API) server that receives crash reports with raw crash data from the mobile devices and facilitates in assigning each crash report to one of several different crash processors. Several examples of distributing crash reports will now be described by reference FIGS. 3 and 4.

A. Enqueuing New Tasks

Figure 3:
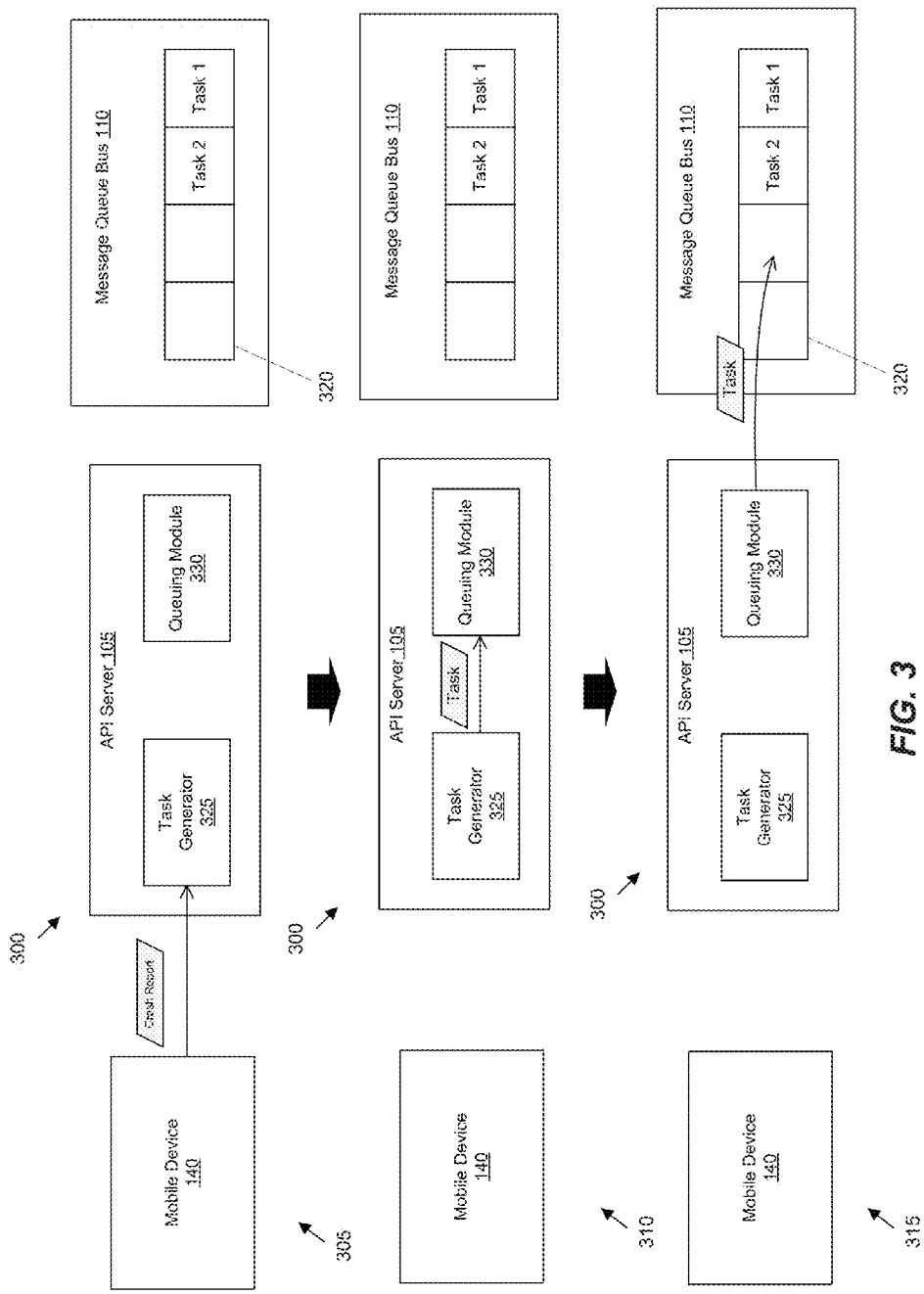
FIG. 3 provides an illustrative example of the API server communicating with a message queue bus to add a crash report as a task in a task queue.

The system of some embodiments uses a task queue to distribute the processing of crash tasks amongst a number of crash processors. FIG. 3 provides an illustrates example of the API server 105 communicating with the message queue bus 110 to add a crash report as a task in a task queue 320. In this example, the API server 105 includes (1) a task generator 325 for generating a task from a crash report and (2) a queuing module 330 for enqueuing the task with the message queue bus 110.

Three operational stages 305-315 of the system 300 are shown in this figure. The first stage 305 shows the mobile device 140 sending the crash report to the API server 110. The second stage 310 shows the system 300 after the API server 110 has received the crash report. In particular, the report is received by the task generator 325. The task generator of some embodiments formats the report in a particular format. For instance, the task generator may generate a new task message and add the contents of the crash report to the body of the message.

The third stage 305 shows the system after generating the new task. Specifically, the queuing module 330 sends the task to the message queue bus 110. The message queue bus receives the new task and then adds it the task queue 320. Here, the task queue includes a number of other tasks that require processing. Thus, the message queue bus 110 adds the new task to the end of the task queue.

B. Example Distribution Scheme

Figure 4:
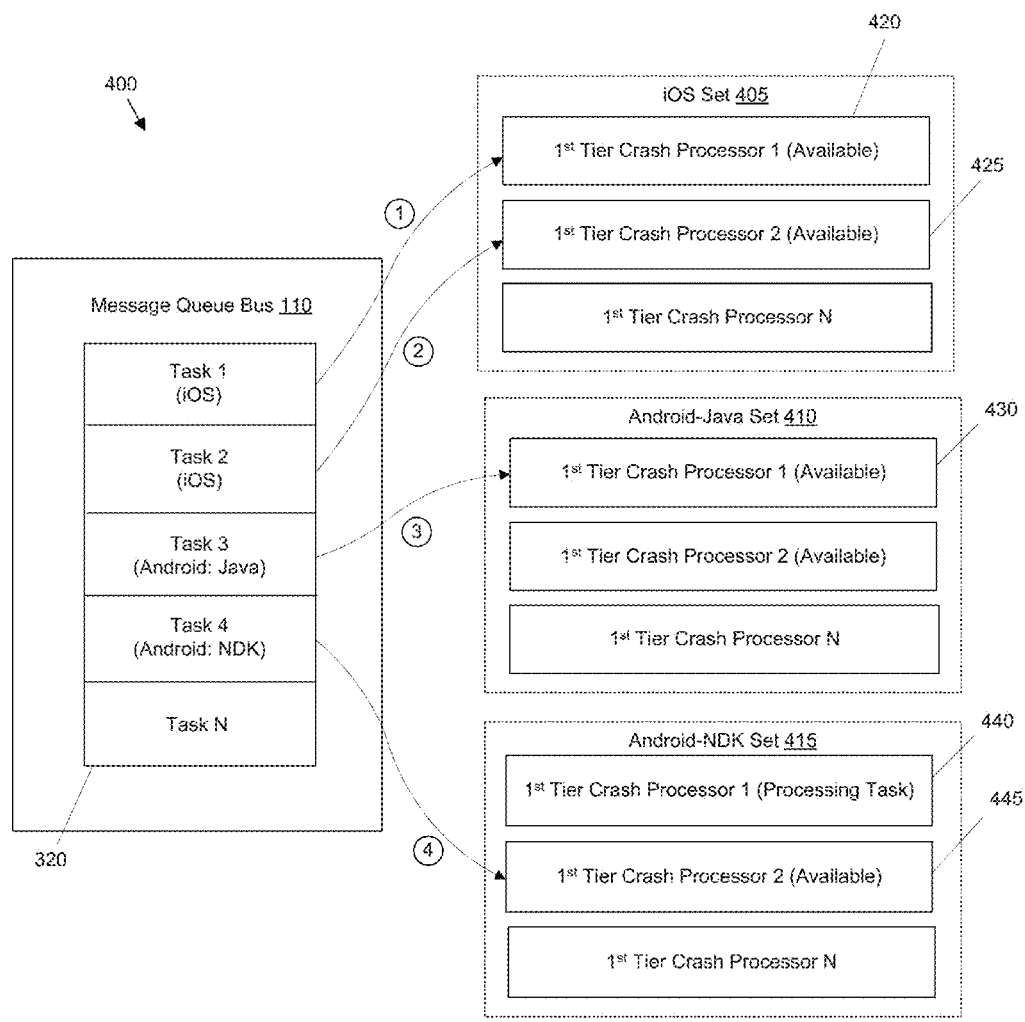
FIG. 4 illustrates an example of the message queue bus distributing tasks in the task queue to several different crash processors.

In the previous example, the API server 105 communicates with the message bus queue 110 to add a new task to the task queue 320. FIG. 4 illustrates an example of the message queue bus 110 distributing tasks in the task queue 320. In this example, the system 400 includes several different sets or groups of first tier crash processors 405-415. Each set can include one or more crash processors, and can be scaled or descaled as necessary depending on load.

In some embodiments, the system 400 provides different crash processors for different types of mobile OSs. In some embodiments, the system 400 provides multiple different crash processors for the same mobile OS. For instance, the system might provide different crash processors for different versions of the same mobile OS. As another example, the system might provide different crash processors for the same mobile OS because the applications can be programmed using different libraries or programing languages. In the example of FIG. 4, the sets of crash processors include (1) an iOS set 405 that handles crash reports from applications running on the iOS platform, (2) an Android-Java set 410 that handles crash report from Android applications programmed at least partially in Java, and (3) an Android-Native Development Kit (NDK) set 415 that handles crash reports from Android applications programmed using the NDK. The NDK provides a tool set that a developer can use to code application using one or more different native-code languages (e.g., C, C++, etc.).

As shown in FIG. 4, the task queue 320 includes a number of different tasks for the different sets of first tier crash processors 405-415. The message queue bus 110 manages the task queue 320 by distributing each task amongst the one or more crash processors in the set of crash processors (405, 410, or 415). For each set, the message queue bus 110 of some embodiments distribute the work in sequence to the next available crash processor following a round robin dispatching scheme.

In some embodiments, the message queue bus assigns the crash reports to different crash processors following the competing consumers design pattern. The competing consumers are the one or more crash processors in a set of crash processors. In the example of FIG. 4, the message queue bus 110 assign the first task, which is an iOS task, to the first available crash processor 420 in the iOS set 405. The message queue bus 110 then assign the second task, which is also an iOS task, to the next available crash processor 425 in the iOS set 405. After assigning the second task, the message queue bus 110 then assigns the third task, which is an Android-Java task, to an available crash processor 430 in the Android-Java set 410. The message queue bus 110 then assigns the fourth task to an available crash processor 445 in the Android-NDK set 415. The fourth task was not assigned to the crash processor 440 because it was busy processing another task.

In some embodiments, the message queue bus 110 supports failover by maintaining each task until the task has been completed by a crash processor. By maintaining the task, the message queue bus 100 prevents the task being lost when a crash processer (e.g., a crash processing server) suddenly fails or dies for some reason without completing the task. To prevent a task from being lost, the message queue bus 110 of some embodiments assigns the task to a crash processor but maintains the task in the task queue 320. When the task has been processed, the crash processor of some embodiments sends a message (e.g., acknowledgment message) to the message queue bus that indicates the completion of the task. Upon receiving the message, the message queue bus 110 may then delete the task from the task queue.

III. Example Operations of Different Crash Processors

The preceding section described distributing the processing of tasks amongst several crash processors. Several examples operations of different crash processors will now be described by reference to FIGS. 5-11.

A. OS Specific Translation

In some embodiments, a first tier crash processor 115 (1) receives a crash report from the message queue bus 110, (2) translates raw crash data into a more human or developer readable form, and (3) stores the translated version in storage. In some embodiments, the translation entails generating a version of the raw crash data with obscure information (e.g., memory addresses) replaced by method or function names. The first tier crash processor may only provide names that are not application specific. This means that the first level processor will provide names for methods or functions that are in different available libraries or application programming interfaces (API) that were used to code the application. However, the first tier crash processor of some embodiments does not provide symbol names of methods (e.g., in other APIs or other libraries) that are written by the application developer.

Figure 5:
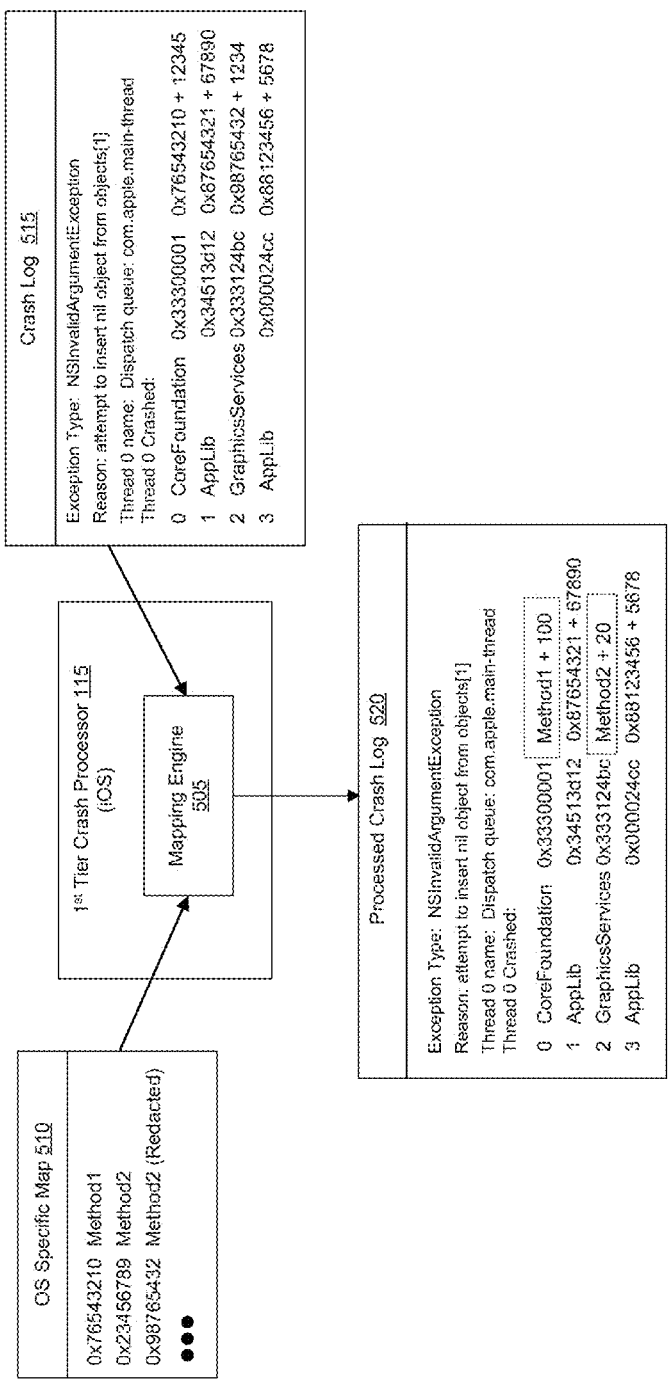
FIG. 5 provides an illustrative example a crash processor that performs a first level translation operation on raw crash data to replace memory addresses with symbol names.

FIG. 5 provides an illustrative example a first tier crash processor 115 that translates raw crash data to replace memory addresses with symbol names. In this example, the crash processor 115 includes a mapping engine. The crash processor 115 of some embodiments is an iOS crash processor that processes crash logs of different iOS applications. In this example, the mapping engine 505 reads a crash log 515 using an OS specific map 510 to output and store a processed crash log 520.

The operation of FIG. 5 begins when the first tier crash processor 115 receives the crash log 515. The crash log includes various information relating to the crash. The crash log includes the exception type, a reason for the exception, and information regarding the thread that crashed. The crash log also shows a stack trace that lists a sequence of method calls that were made by the application leading up to the crash. The sequence is shown in reverse order starting with the first line item that represents the method call that resulted in the application crash, proceeding with the next line item that represents a previous method call made in the same thread, and so forth.

The crash log 515 shows a stack trace for an application written in Objective-C. Here, each line item includes a stack line number, a name of a library associated with the method call, the address of the code that is being executed, the starting address of the binary where the code is being executed, and the offset within the binary. Different from the crash log, the OS specific map 510 includes various memory addresses and their corresponding symbol names.

In some embodiments, the OS specific map 510 is a custom map that includes symbol names of different methods that are redacted in APIs used to program the application. For instance, in the example of FIG. 5, the OS specific map 510 includes two different numbers (e.g., addresses) for the same method (i.e., method2). There are several reasons why the OS specific map includes the names of methods that are redacted. First, for certain higher versions of a particular mobile OS (e.g., iOS), the particular mobile OS generates a stack trace has different numbers (e.g., memory addresses) for methods that are redacted. This means that a stack trace from a lower version of the same mobile OS will not list the same numbers for the same methods. Without the names of the redacted methods, a translation of a stack trace of the higher version mobile OS may result in the stack trace listing a redacted method not by symbol name but by a label (e.g., "redacted" label). Accordingly, the OS specific custom map 510 provides the means to identify the symbol names for different redacted methods.

Another reason why the system of some embodiments uses a custom map is to identify a total occurrence of the same crash. For instance, the same crash may be occurring in different versions of the same mobile OS. By using the custom map, the first tier crash processor generates a translated version of the stack trace that is version free. In other words, the system translates stack traces to generate versions of the stack traces that are all at the same level. This allows the stack traces to be compared with one another (e.g., to identify the total occurrences of different crashes). For instance, the crash processor of some embodiments generates a hash code based on the version free stack trace. The hash code is then used to determine how many other times the same crash occurred across a number of mobile devices. An example of generating a hash code based on a stack trace will be described below by reference to FIG. 6.

Referring to FIG. 5, the first tier crash processor 115 receives the OS specific map 510 and the crash log 515, and generates a processed crash log 520. In generating, the mapping engine 505 has read the OS specific map 510 and replaced several binary memory addresses in the stack trace 515 with symbol names. The mapping engine 505 has also replaced the offset information with code line numbers.

B. Generating a Hash

Figure 6:
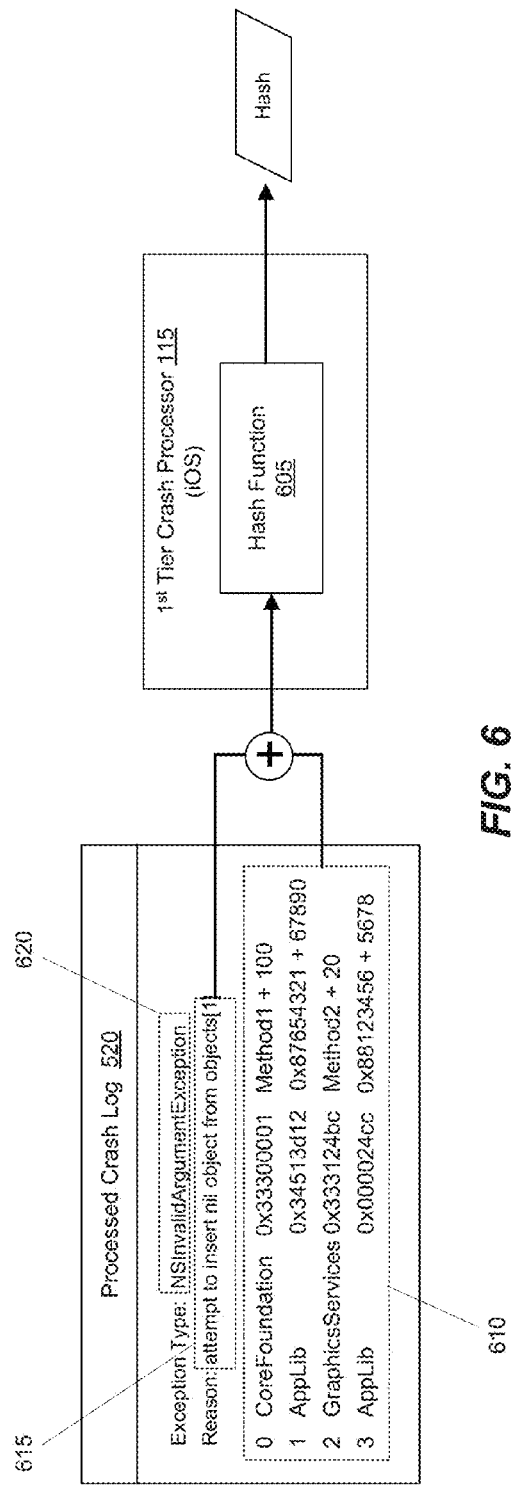
FIG. 6 provides an illustrative example of generating a hash code based on a crash log.

As method above, the first tier crash processor of some embodiments generates a hash code from a crash log in order to identity or classify the error in the crash log. In some embodiments, the hash code is used provide a total number of occurrences of the same crash in one or more mobile devices. FIG. 6 provides an illustrative example of generating a hash code from a crash log. In this example, the first tier crash processor 115 includes a hash function 605 for generating a hash code based on a crash log 520.

In some embodiments, the first tier crash processor 115 generates a hash code using one or more code line items in a stack trace. The first tier crash processor 115 may use all line items in the stack trace. This is because, typically, the information leading up to a crash may be just as important as identifying a particular method call invocation (e.g., a first code line item) that resulted in the crash. For instance, two stack traces can have the same function crash an application. However, the path to get to the function may be different. The developer may care that the stack traces show two different code paths that lead to the application crashing, and may wish to have the two crashes identified as different crashes. Thus, if only the first line item is hashed, the system may be (e.g., inadvertently) hiding different types crashes. In some embodiments, the crash processor generates a hash code by adding all the line items into one long string and uses the string as input to the hash function 605.

In conjunction with the stack trace line items or instead of them, the first tier crash processor of some embodiments generates a hash using other information. In some embodiments, the system uses crash metadata in the crash log 520 or the stack trace to generate the hash code. For instance, in the example FIG. 6, the crash processor generates the hash code by taking into account the reason 615 for the exception. Here, the crash processor may take into account the exception type rather than the reason, or take into account both the reason and the exception type when generating the has code.

C. Application Specific Translation

As mentioned above, the first tier crash processor of some embodiments determines whether the crash data should be processed by one of the second tier crash processors. In some embodiments, the second tier crash processor performs an application specific mapping operation on a code stack trace to provide symbol names for different application methods. Alternatively, the second tier crash processor performs a different translation to de-obfuscate code in a code stack trace. In some embodiments, the second tier processing is only performed when a particular map (e.g., a symbol mapping file or an obfuscation mapping file) is available.

Figure 7:
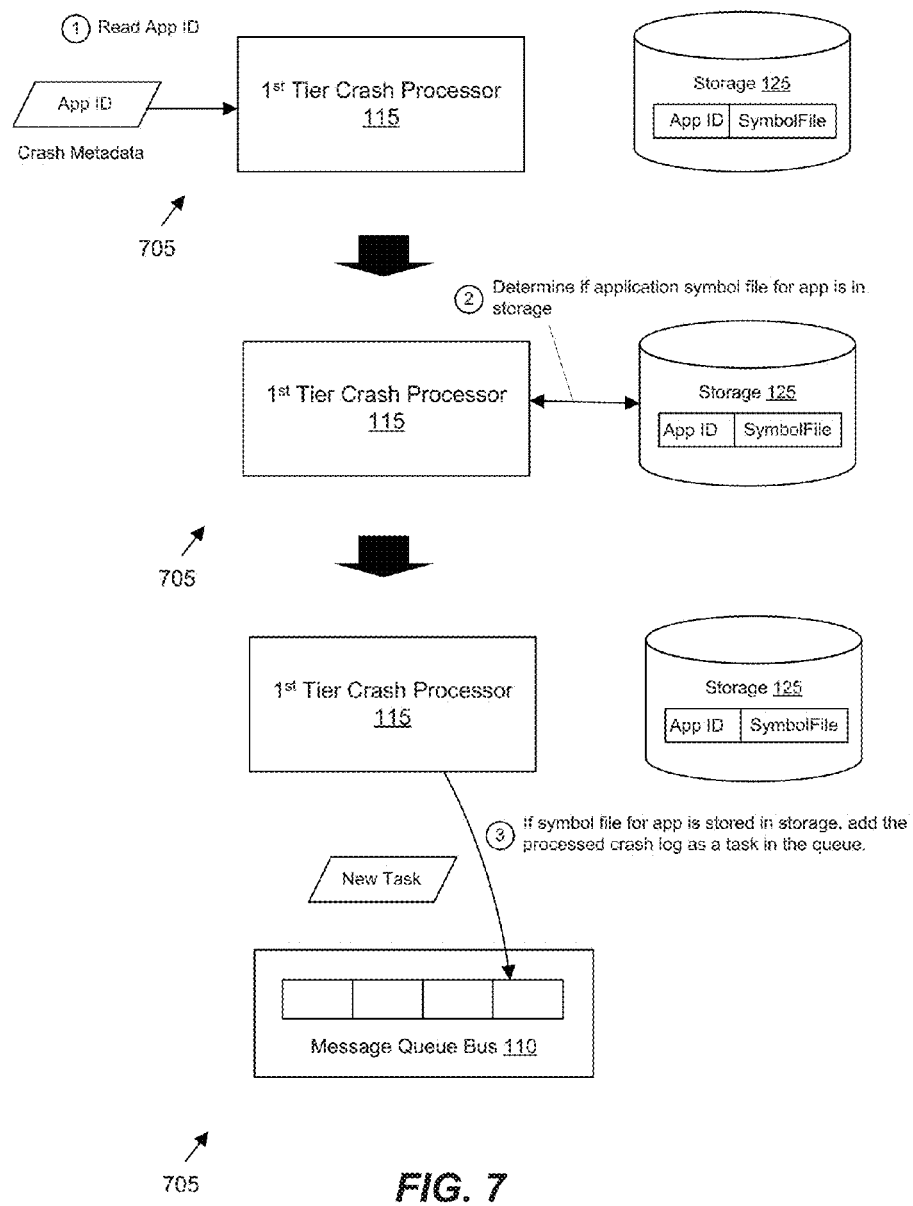
FIG. 7 provides an illustrative example of a first tier crash processor that determines whether the crash data should be processed by one of the second tier crash processors FIG. 8 provides an illustrative example a crash processor that performs a second level translation operation on crash data to replace memory addresses with symbol names.

FIG. 7 provides an illustrative example of a first tier crash processor that determines whether the crash data should be processed by one of the second tier crash processors. The figure include the first tier crash processor, the storage, and the message queue bus 110, which are described above by reference to FIG. 1.

Three operational stages 705-715 of the system 700 are shown in this figure. The first stage 705 shows the crash processor 115 reading a piece of metadata from a crash report. The piece of metadata is the application identifier (ID). However, the crash processor may use a different piece of metadata, such as OS version number.

The second stage 710 shows the crash processor 115 determining if the symbol file for an application is stored in storage 125. In particular, the crash processor queries the storage using the application ID. The third stage 715 illustrates the crash processor 115 after determining that the symbol file is stored in storage based on the query. In particular, the crash processor communicates with the message queue bus to add a new task to the task queue.

Figure 8:
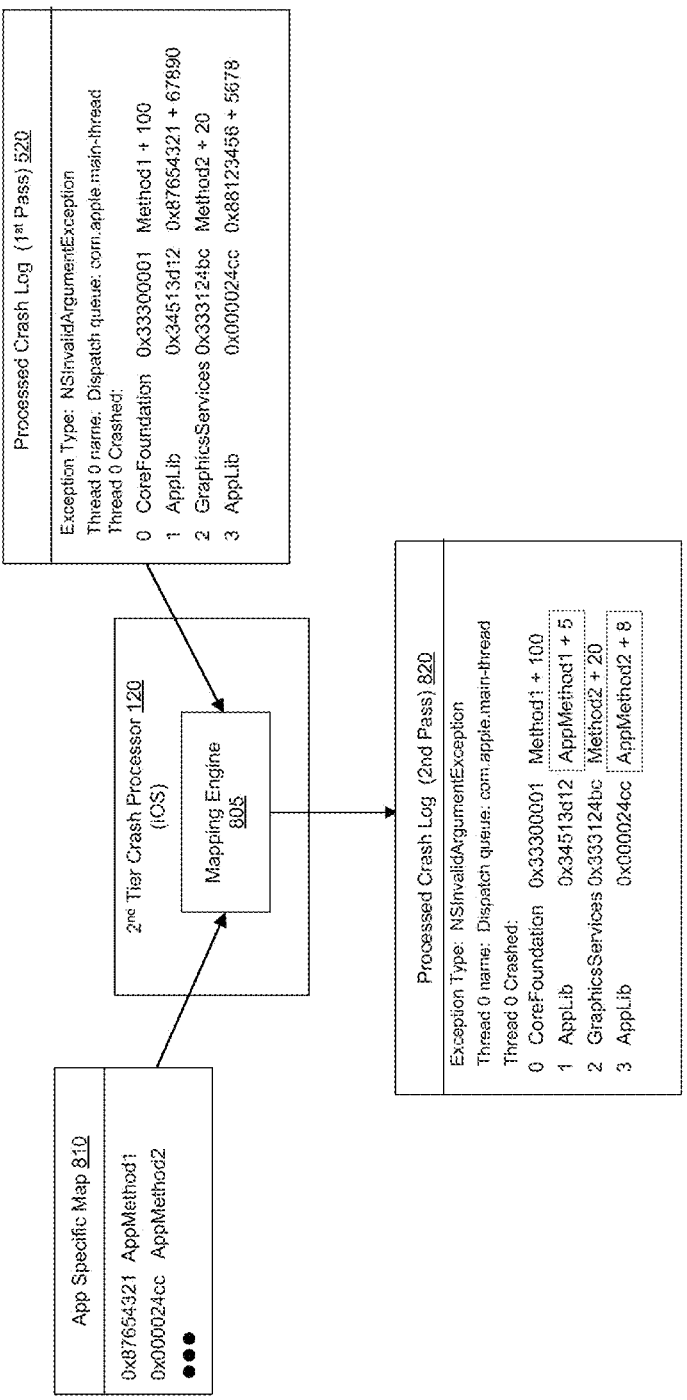

FIG. 8 illustrates an example of a translation operation performed by a second tier crash processor 120 to translate a crash log 520. The crash processor 120 of some embodiments is an iOS crash processor that processes crash logs of different iOS applications. This figure is similar to FIG. 5. However, in FIG. 8, the second tier crash processor 120 uses an application specific map instead of the OS specific map. As shown, the mapping engine 805 has read the application specific map 810 and replaced several binary memory addresses in the stack trace with symbol names. The mapping engine 805 has also replaced the offset information with code line numbers.

Figure 9:
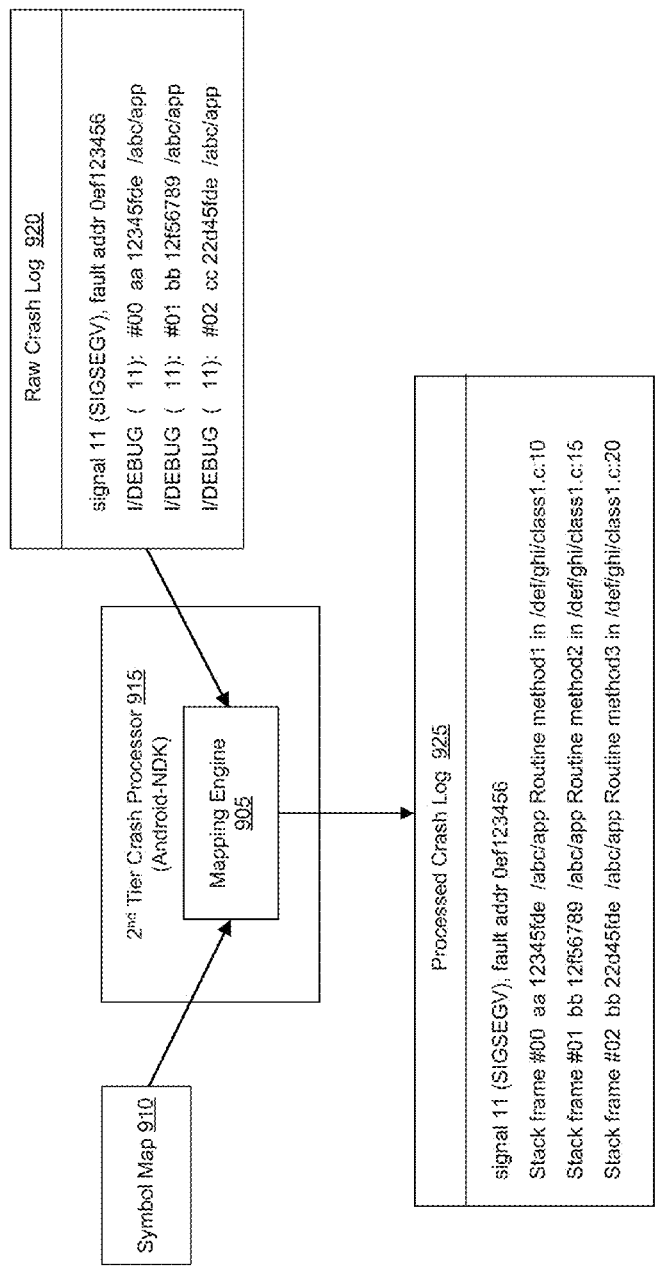
FIG. 9 illustrates an example a crash processor that performs a symbolication operation on a crash log.

FIG. 9 illustrates another example of a translation operation performed by a second tier crash processor. This figure is similar to the previous figure in that the second tier processor 915 performs a symbolication operation on a stack trace of code 920. However, in the example of FIG. 9, the second tier crash processor 915 processes stack traces from Android applications that are at least partially coded using Android-NDK. Also, the second tier processor 915 is performing a first level translation on the stack trace 920 rather than a second level translation.

As shown, the mapping engine 905 has read the symbol map 910 and performed a symbolication operation on a crash log 920. The crash log 920 shows a reason for the fault (e.g., a segmentation violation), a fault address, and several lines of un-readable debug code. The raw crash log 920 may contain other data. The processed crash log 925 shows that the mapping engine 905 has replaced the un-readable debug code with stack frame data. In the processed crash log 925, the mapping engine 905 has also provided various method names, line numbers, and source code file information (e.g., source code location information).

In some embodiments, a crash processor performs a different translation to de-obfuscate code in a code stack trace. As an example, the application's release code may be processed with a particular tool to obfuscate the code in order to prevent reverse engineering and/or to shrink the size of the application file(s). For instance, the application developer may have processed the application using ProGuard. Proguard is a Java class file shrinker, optimizer, obfuscator, and pre-verifier. Proguard detects and removes unused classes, fields, methods, and attributes. Proguard also optimizes bytecode and removes unused instructions. Proguard also renames the remaining classes, fields, and methods using short meaningless names.

Figure 10:
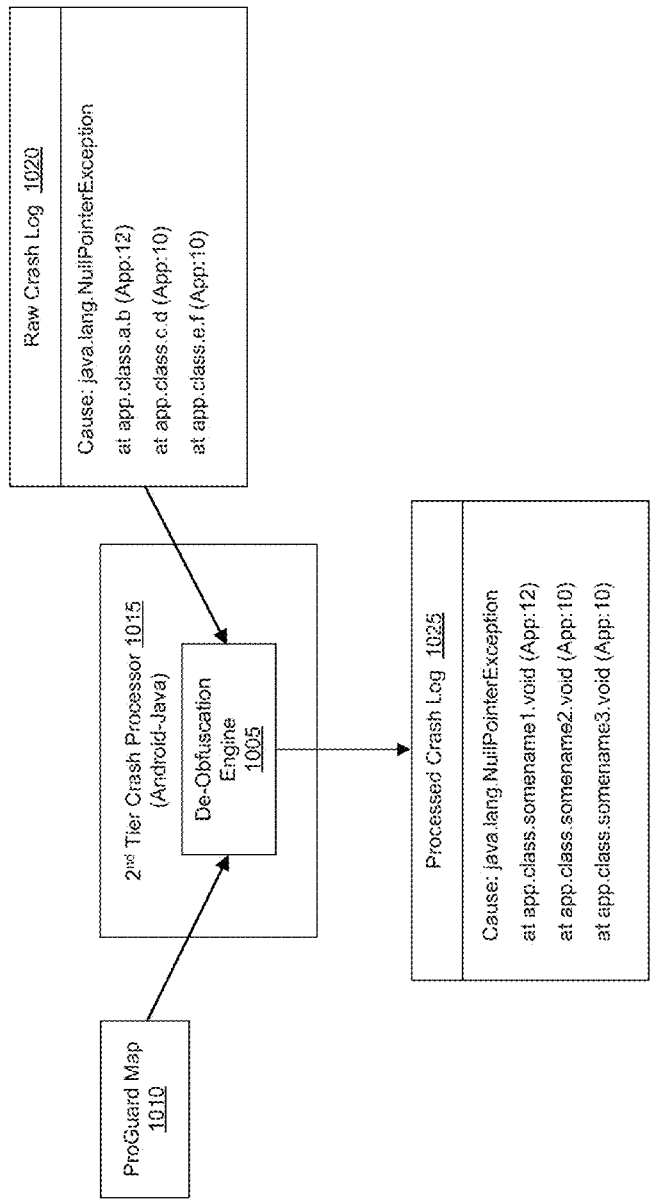
FIG. 10 illustrates an example a crash processor that performs a de-obfuscation operation on a crash log.

In some embodiments, the crash processor (first tier or second tier) uses a ProGuard map file to provide symbol names for the classes, fields, and methods. Similar to the symbol map file, the ProGuard map file may be uploaded to the system by an application developer. FIG. 10 illustrates an example of a second tier crash processor 1015 that uses such a map 1010 to de-obfuscate a crash log 1020. This example is similar to the previous two examples. However, the second tier processor 1015 processes stack traces from Android applications that are at least partially coded using Java. Also, the figure includes a de-obfuscation engine 1005 that reads a ProGuard map 1010 to process the crash log 1020.

As shown, the de-obfuscation engine 1005 has read the ProGuard map 1010 and performed a de-obfuscation operation on a raw crash log 1020. The raw crash log 1020 shows a reason for or cause of the crash, and several lines of codes that are obfuscated. The processed crash log 1025 shows that de-obfuscation engine 1005 has de-obfuscated the raw cash log 1020 by providing method names and other code information (e.g., method parameter information) using the ProGuard map 1010.

D. Example Process

Figure 11:
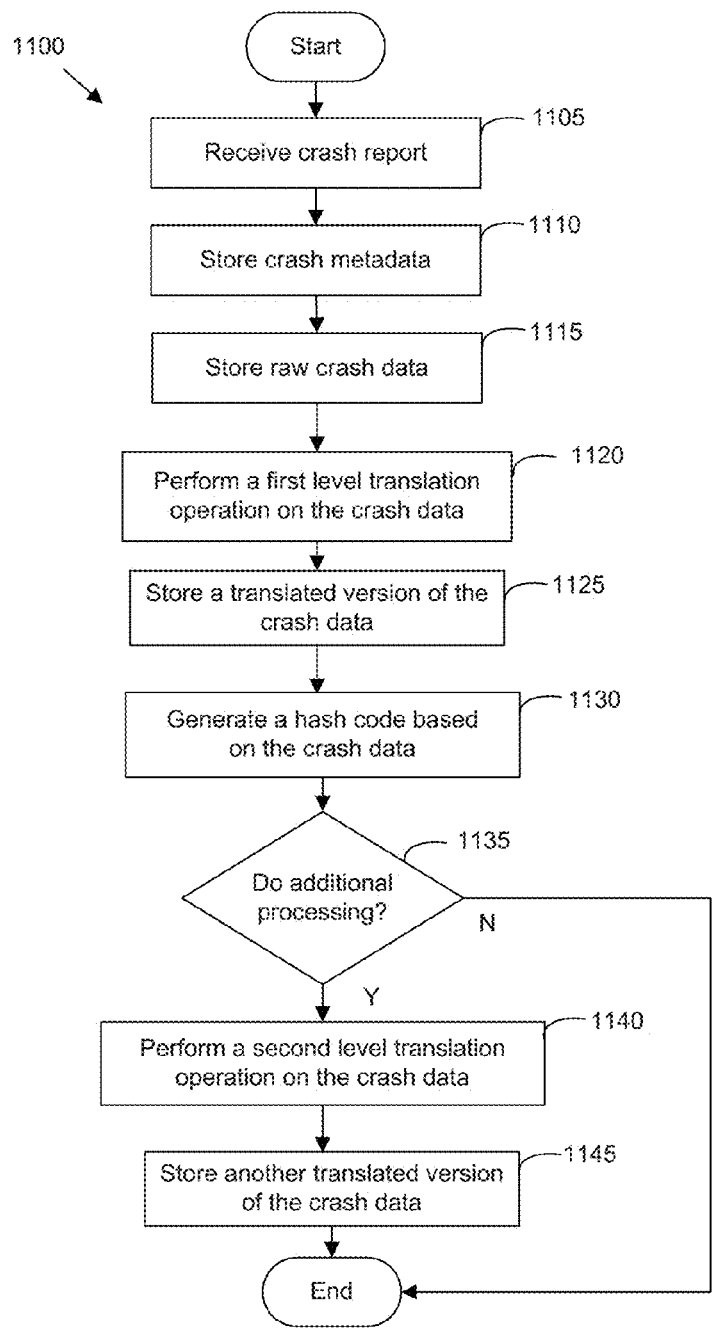
FIG. 11 conceptually illustrates a process that some embodiments implement to store data relating to an application crash.

Having described example operations of several crash processors, an example process will now be described. FIG. 11 conceptually illustrates a process 1100 that some embodiments implement to store data relating to an application crash. In some embodiments, the process 1100 is performed by one or more crash processors.

The process 1100 begins (at 1105) when it receives a crash report. The process 1100 then stores (at 1110) crash metadata from the crash report in storage. Examples of crash metadata include an application identifier and mobile state data (e.g., network connectivity information, carrier information, location information etc.). Additional examples of crash metadata will be described below by reference to FIG. 12.

As shown in FIG. 11, the process 1100 stores (at 1115) raw crash data from the crash report in storage. The process 1100 then performs a first translation (at 1120) on the raw crash data. In some embodiments, the translation entails generating a symbolicated version of a stack trace by replacing memory addresses with symbol names. In some embodiments, the process 1100 also replaces offset information associated with the memory addresses with code line numbers. In some embodiments, the process 1100 uses a symbol map (e.g., an OS specific map file) to identify symbol names. The process 1100 of some embodiments identifies a particular symbol map based on the crash metadata. As an example, the process 1100 may identify a particular symbol map for a particular mobile OS using an application ID or some other piece of crash metadata such as OS version. After performing the translation operation, the process 1100 stores (at 1125) a translated version of the raw crash data in storage.

In some embodiments, the first level translation is performed for crash logs of applications associated with a particular mobile OS. For instance, in some embodiments, the process only performs the first level translation for stack traces of iOS applications. That is, the process does not perform the first level translation for stack traces of Android applications (e.g., Android-Java applications, Android-NDK applications). The first level translation may be performed to place a stack trace in a mobile OS version-free format in order to generate a hash code.

At 1130, the process 1100 generates a hash code based on the crash data. In some embodiments, the hash code is used to provide a total count or an estimated total count of the occurrence of a particular crash. In some embodiments, prior to hashing, the process 1100 performs one or more operations on some or all stack traces to bring them up to a level where they can be compared with one another. For instance, the process 1100 might generate a version of the stack trace having method names for method that have been redacted.

At 1135, the process 1100 determines whether to perform a second level translation on the crash data. In some embodiments, the process 1100 makes this determination based on whether a map (e.g., a symbol map file, a ProGuard map file) is available for an application. If the second level translation cannot be performed or is not required, the process 1100 ends. Otherwise, the process 1100 performs (at 1140) a second level translation on the crash data. The process 1100 then stores (at 1145) another translated version of the crash data. The process 1100 then ends.

Some embodiments perform variations on the process 1100. The specific operations of the process 1100 may not be performed in the exact order shown and described. The specific operations may not be performed in one continuous series of operations, and different specific operations may be performed in different embodiments. Further, the process 1100 could be implemented using several sub-processes, or as part of a larger macro process.

IV. Example Data Structure

Figure 12:
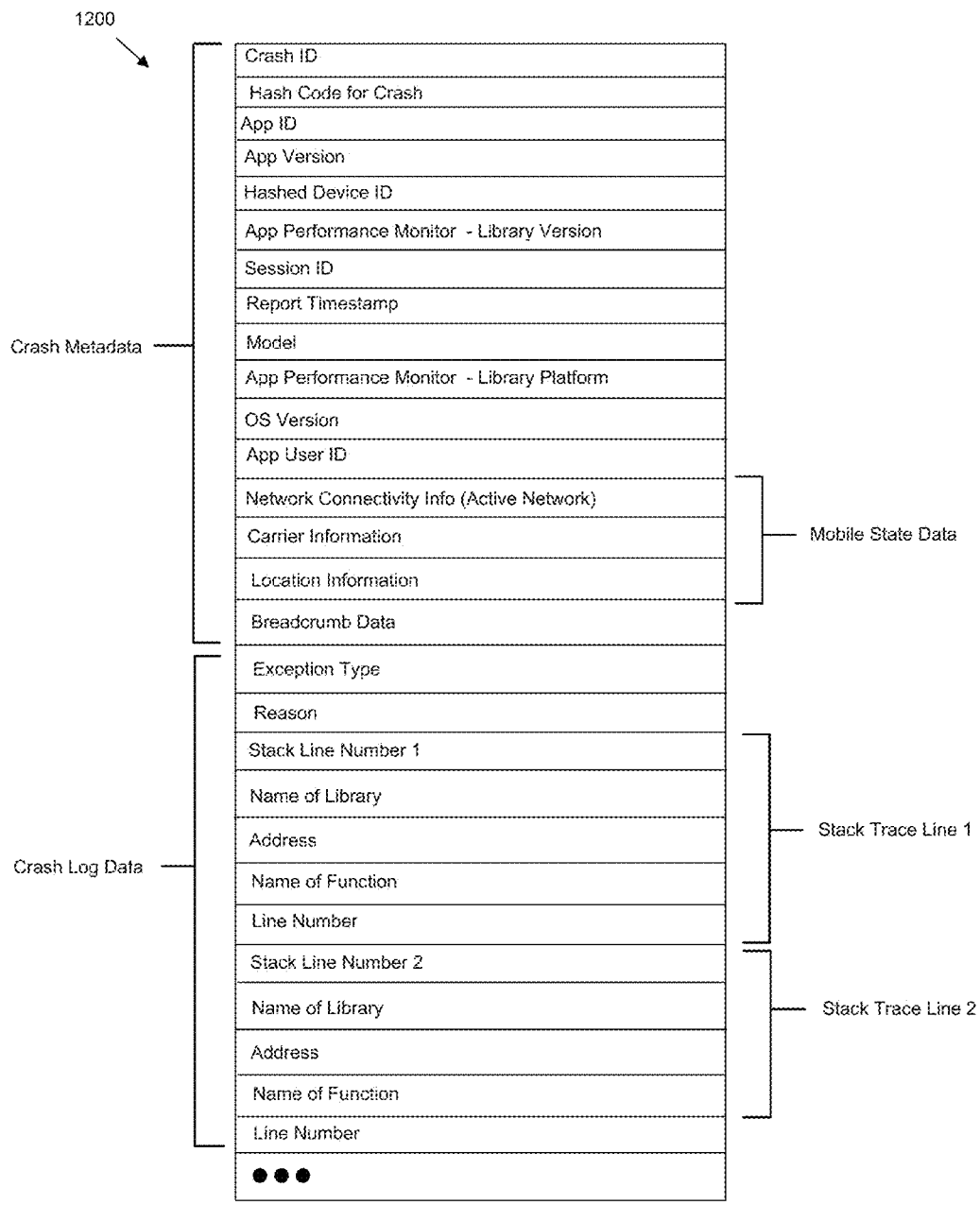
FIG. 12 illustrates an example data structure that is used to store data relating to a crash.

FIG. 12 illustrates an example data structure 1200 that is used to store data relating to a crash. As shown, the data structure can include metadata and crash data. In some embodiments, the crash metadata includes a crash identifier (ID) (e.g., to identifying the crash), an application ID (e.g., randomly generated mAPM solution provider ID identifying the app), the version of the application (e.g., version number), hashed device ID (e.g., a randomly generated string which can be used as an internal identifier for user), the version of the library or the software development kit (SDK) (e.g., used to enable application performance monitoring on the application), library platform (e.g., the application performance monitor's platform, such as iOS, Android, or Windows Phone), and the version of the OS (e.g., Android—4.4 KitKat).

In some embodiments, the metadata includes mobile state data. An example of storing mobile state data is described above by reference to FIG. 2. In some embodiments, the mobile state data can include any one or more of the following: carrier info (e.g., the name or identity of the wireless carrier that is servicing the mobile device), geo location information (e.g., latitude, longitude), network connectivity information (e.g., whether the device was on Wi-Fi, cellular, or not connected), mobile network code (MNC), mobile country code (MCC), roaming, time, battery level, memory usage, up time, whether the device is compromised (e.g., jailbroken or rooted).

In some embodiments, the metadata includes breadcrumb data. In some embodiments, the application performance monitor includes a breadcrumb data collector to aggregate breadcrumb data. The breadcrumb detection is a special feature a company or app developer can implement which allows them to specify a series of events that occurred before the crash occurred. The breadcrumb data collector is customizable by the developer. For instance, the developer might want to know what chain of events (e.g., "Pressed Login", "View Account", "Variable=0") led to the crash in the application. Thus, the developer can specify a list of items (e.g., changes to the application, such as an end user navigated to a different application tab, the end user when to a screen to get a list of songs, etc.).

When there is a crash, the breadcrumbs are then sent with the crash report or as part of the crash report. In this manner, the developer can have an understanding of the series of one or more events that occurred prior to crash. In some embodiments, developers can specify what breadcrumbs they would like to track through the performance monitor tool or kit (SDK). For instance, the developers can leave breadcrumbs through a SDK call: [Service monitor leave Breadcrumb: @"hello world"]. This is an example of a user-defined breadcrumb. In some embodiments, the system includes a service monitor captures network breadcrumbs. In some embodiments, the network breadcrumbs are logged automatically when any network call happens. In some embodiments, the network breadcrumbs are logged automatically but do not show up on error reports unless specified by a developer. Alternatively, the network breadcrumbs may only be logged after the developer instructs the service monitor to log network breadcrumbs.

In some embodiments, the service monitor is used to track only a set number of network breadcrumbs. The service monitor may only log the last several connections, and not all connection. For instance, the service monitor may be used to log the last ten network connections. In some embodiments, the number of network breadcrumbs the service monitor logs can be customized based on user input. That is, the performance monitor tools of some embodiments may allow a user to specify (e.g., through the performance monitor tool or kit) the maximum number of breadcrumbs to track. In some embodiments, the breadcrumb data collector only retains the last several number of network breadcrumbs in a (e.g., circular) buffer or queue.

In some embodiments, the crash data includes exception type (e.g., that identifies the type of exception) and the reason for the exception (e.g., the cause of the exception). The crash data of some embodiments includes information regarding a crashed thread. In some embodiments, the system stores each code line item to storage. This is shown in FIG. 12 as the data structure includes several line items. For each line, the data structure can include one or more of the following: (1) a stack line item number, (2) the name of the library or API, (3) a memory address, (4) name of function, and (5) a line number within the code that is associated with the function.

In some embodiments, the system stores multiple versions of a crash log. For instance, the system might store the raw crash data in the crash log. The system might perform one level of translation to generate and store a translated version. The system might perform another level of translation to generate and store another translated version. One or ordinary skill in the art will also recognize that the data structure shown in FIG. 12 is just one of many different ways to store data. For instance, instead of one data structure, the system might use multiple data structures to store the data. In addition, the data structure shows example data fields. For instance, different embodiments may have additional fields or even fewer fields.

V. Example Crash Reports

Figure 13:
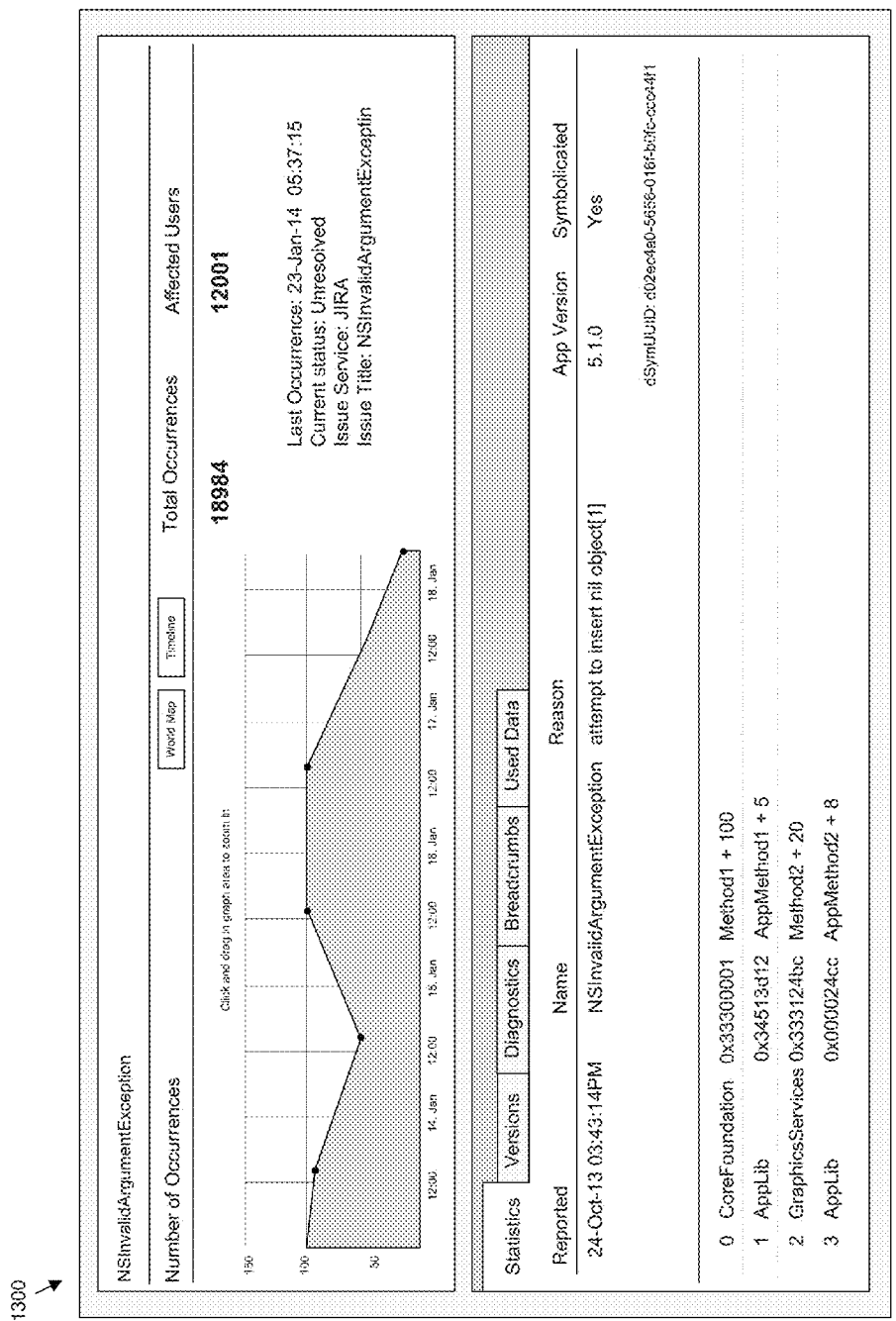
FIG. 13 illustrates an example of a crash report generated by a web portal using the stored crash data.

As mentioned above, the web portal of some embodiments provides one or more different crash reports to a web portal client. FIG. 13 illustrates an example of a crash report 1300 generated by the web portal. The generated report is presented on a client device upon user input (e.g., by a developer to view real-time data). As mentioned above, the client machine may be running a thin-client or thick client, in some embodiments.

As shown, the report 1300 includes many of the crash data described above by reference to FIG. 12. Specifically, the report 1300 shows a reported timestamp, the name or type of exception, the reason for the exception, the app version number, the stack track with each line of code leading up to the crash.

The report 1300 also shows statistical information based on the generated hash code. The report includes the total number of occurrences of the same crash. The report also includes a graph that shows the number of occurrences of the same crash over a particular time period. Although the figure shows a line graph, the report 1300 may present other types of graphs (e.g., a line graph, pie chart, etc.) or other types of graphical representation (e.g., media presentation or animation) of the captured data. The report also filters the occurrences to different users or mobile devices to provide the total number of affected user. The report also provides the last occurrence of the same crash, whether the crash has been resolved, etc. Furthermore, the report includes a first field that indicates whether a symbol map (e.g., dSym file) has been uploaded by the developer and a second field that indicates whether the crash log has been symbolicated.

VI. Electronic Systems

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 14:
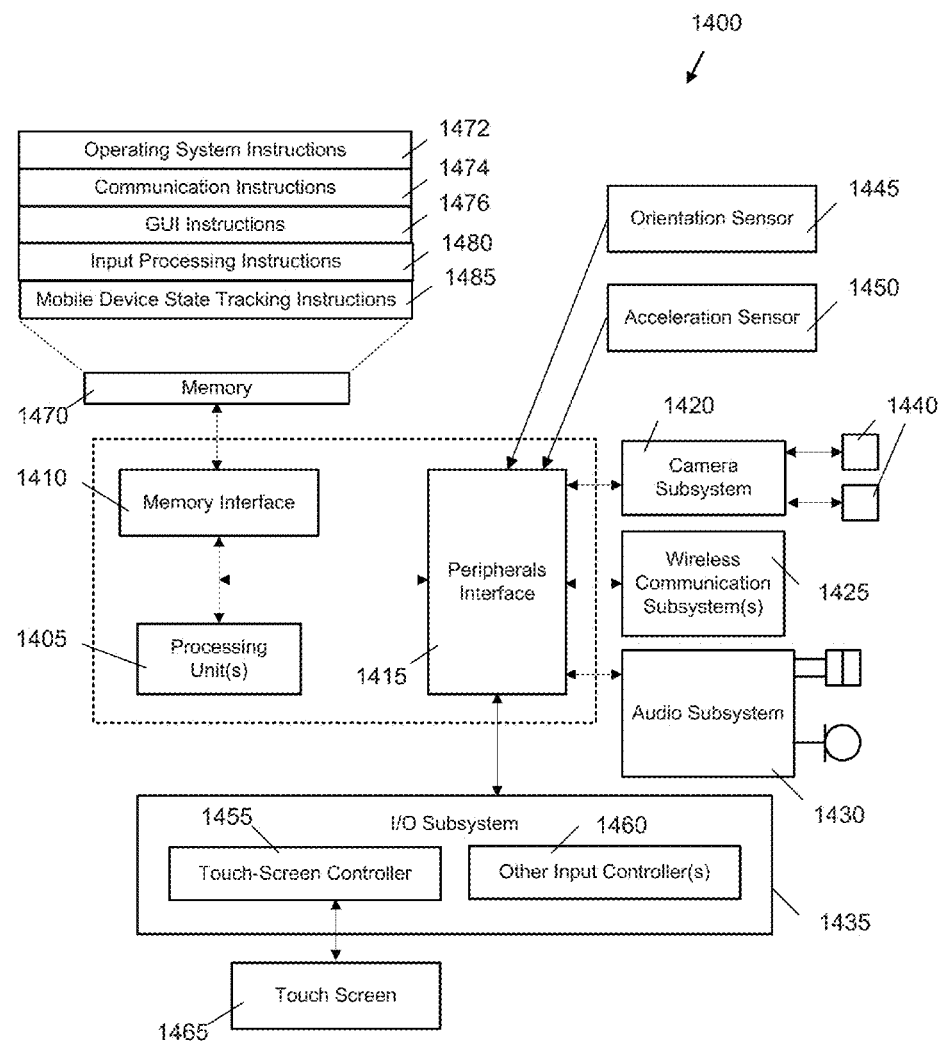
FIG. 14 is an example of an architecture of a mobile computing device.

The crash monitor of some embodiments operates on mobile devices. The applications of some embodiments operate on mobile devices. FIG. 14 is an example of an architecture 1400 of such a mobile computing device. Examples of mobile computing devices include smartphones, tablets, laptops, etc. As shown, the mobile computing device 1400 includes one or more processing units 1405, a memory interface 1410 and a peripherals interface 1415.

The peripherals interface 1415 is coupled to various sensors and subsystems, including a camera subsystem 1420, a wireless communication subsystem(s) 1425, an audio subsystem 1430, an I/O subsystem 1435, etc. The peripherals interface 1415 enables communication between the processing units 1405 and various peripherals. For example, an orientation sensor 1445 (e.g., a gyroscope) and an acceleration sensor 1450 (e.g., an accelerometer) is coupled to the peripherals interface 1415 to facilitate orientation and acceleration functions.

The camera subsystem 1420 is coupled to one or more optical sensors 1440 (e.g., a charged coupled device (CCD) optical sensor, a complementary metal-oxide-semiconductor (CMOS) optical sensor, etc.). The camera subsystem 1420 coupled with the optical sensors 1440 facilitates camera functions, such as image and/or video data capturing. The wireless communication subsystem 1425 serves to facilitate communication functions. In some embodiments, the wireless communication subsystem 1425 includes radio frequency receivers and transmitters, and optical receivers and transmitters (not shown in FIG. 14). These receivers and transmitters of some embodiments are implemented to operate over one or more communication networks such as a GSM network, a Wi-Fi network, a Bluetooth network, etc. The audio subsystem 1430 is coupled to a speaker to output audio (e.g., to output different sound effects associated with different image operations). Additionally, the audio subsystem 1430 is coupled to a microphone to facilitate voice-enabled functions, such as voice recognition, digital recording, etc.

The I/O subsystem 1435 involves the transfer between input/output peripheral devices, such as a display, a touch screen, etc., and the data bus of the processing units 1405 through the peripherals interface 1415. The I/O subsystem 1435 includes a touch-screen controller 1455 and other input controllers 1460 to facilitate the transfer between input/output peripheral devices and the data bus of the processing units 1405. As shown, the touch-screen controller 1455 is coupled to a touch screen 1465. The touch-screen controller 1455 detects contact and movement on the touch screen 1465 using any of multiple touch sensitivity technologies. The other input controllers 1460 are coupled to other input/control devices, such as one or more buttons. Some embodiments include a near-touch sensitive screen and a corresponding controller that can detect near-touch interactions instead of or in addition to touch interactions.

The memory interface 1410 is coupled to memory 1470. In some embodiments, the memory 1470 includes volatile memory (e.g., high-speed random access memory), non-volatile memory (e.g., flash memory), a combination of volatile and non-volatile memory, and/or any other type of memory. As illustrated in FIG. 14, the memory 1470 stores an operating system (OS) 1472. The OS 1472 includes instructions for handling basic system services and for performing hardware dependent tasks.

The memory 1470 may include communication instructions 1474 to facilitate communicating with one or more additional devices; graphical user interface instructions 1476 to facilitate graphic user interface processing; input processing instructions 1480 to facilitate input-related (e.g., touch input) processes and functions. The memory may also include other instructions such as instructions 1485 to update different types of mobile device state (e.g., location information, carrier information, network connectivity information, etc.). The instructions described above are merely exemplary and the memory 1470 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 14 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 14 may be split into two or more integrated circuits.

B. Computer System

Figure 15:
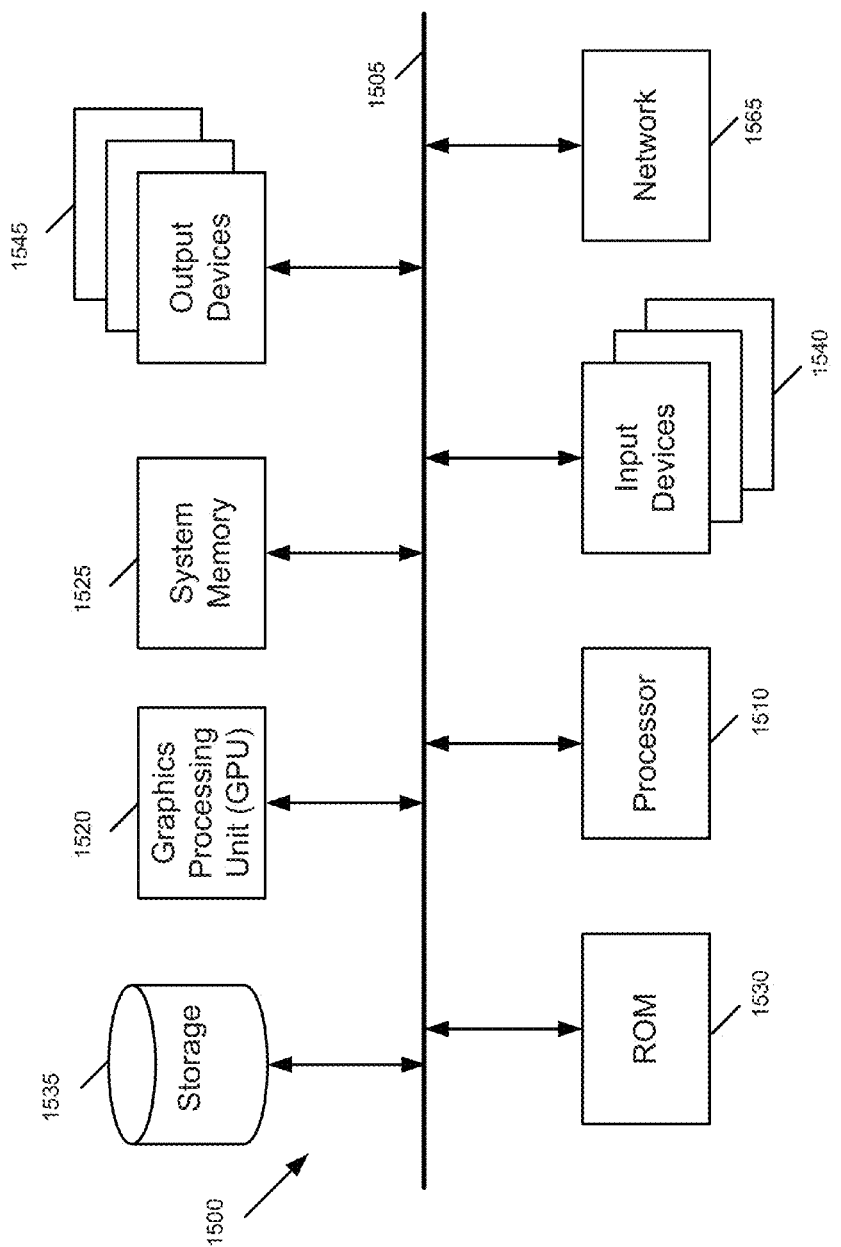
FIG. 15 conceptually illustrates another example of an electronic system with which some embodiments of the invention are implemented.

FIG. 15 conceptually illustrates another example of an electronic system 1500 with which some embodiments of the invention are implemented. The electronic system 1500 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1500 includes a bus 1505, processing unit(s) 1510, a graphics processing unit (GPU) 1515, a system memory 1520, a network 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the GPU 1515, the system memory 1520, and the permanent storage device 1535.

From these various memory units, the processing unit(s) 1510 retrieves instructions to execute and data to process in order to execute the processes of the invention. The processing unit(s) may be a single processor or a multi-core processor in different embodiments.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash memory device, etc., and its corresponding drive) as the permanent storage device. Like the permanent storage device 1535, the system memory 1520 is a read-and-write memory device. However, unlike storage device 1535, the system memory 1520 is a volatile read-and-write memory, such a random access memory. The system memory 1520 stores some of the instructions and data that the processor needs at runtime. In some embodiments, the invention's processes are stored in the system memory 1520, the permanent storage device 1535, and/or the read-only memory 1530. From these various memory units, the processing unit(s) 1510 retrieves instructions to execute and data to process in order to execute the processes of some embodiments.

The bus 1505 also connects to the input and output devices 1540 and 1545. The input devices 1540 enable the user to communicate information and select commands to the electronic system. The input devices 1540 include alphanumeric keyboards and pointing devices (also called "cursor control devices"), cameras (e.g., webcams), microphones or similar devices for receiving voice commands, etc. The output devices 1545 display images generated by the electronic system or otherwise output data. The output devices 1545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 15, bus 1505 also couples electronic system 1500 to a network 1525 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. Also, while many of the features of the service monitor have been described as being performed by one component or module (e.g., the output agent, the mobile device state data collector, etc.), one of ordinary skill in the art will recognize that the functions of such components described herein might be split up into multiple sub-components. Similarly, functions described as being performed by multiple different components might be performed by a single component, in some embodiments. Further, while many of the features of the service monitor have been described as being performed by one module, one of ordinary skill in the art will recognize that the functions of such components described herein might be split up into multiple components. Similarly, functions described as being performed by multiple different components might be performed by a single component, in some embodiments. In addition, FIG. 11 conceptually illustrates a process. The specific operations of the process may not be performed in the exact order shown and described. The specific operations may not be performed in one continuous series of operations, and different specific operations may be performed in different embodiments. Furthermore, the process could be implemented using several sub-processes, or as part of a larger macro process.

What is claimed is:

1. A system comprising:
   a plurality of crash processing servers, each including at least one crash processor of a plurality of different crash processors; and
   an application programming interface (API) server that receives, from a plurality of different mobile devices, raw crash logs and facilitates in assigning each crash log to one of the plurality of different crash processors, wherein a particular crash processor receives a particular crash log and performs a symbolication operation to provide one or more symbol names in order to present at least one crash report to an application developer.

2. The system of claim 1 wherein each mobile device of the plurality of different mobile devices includes an application with an application monitor for reporting each detected application crash to the API server.

3. The system of claim 2, wherein the application monitor is further for reporting a state of a mobile device at a time of a crash along with a detected application crash.

4. The system of claim 1, wherein the API server facilitates in assigning a specific crash log to one of the plurality of different crash processors by adding the specific crash log to a task queue.

5. The system of claim 4, wherein the task queue is implemented by a message queue bus that distributes each crash log to one of the plurality of different crash processors.

6. The system of claim 1, wherein the particular crash processor is further to generate a hash code based on the particular crash log, wherein the hash code is used to determine a total number of occurrences a same crash as a crash specified in the particular crash log.

7. The system of claim 6, wherein the crash processor performs the symbolication operation by placing the particular crash log in a mobile operating system (OS) version-free format in order to generate the hash code.

8. The system of claim 1, wherein the plurality of different crash processors includes at least two tiers of crash processors, wherein a first tier crash processor performs a first level symbolication operation to provide one or more symbol names for methods that are mobile OS specific, wherein a second tier crash processor performs a second level symbolication operation to provide one or more symbol names for methods that are application specific.

9. The system of claim 8, wherein the first tier crash processor performs the first level symbolication operation using a custom map file, wherein the custom map file provides mapping for a set of symbols for a set of OS specific methods that are redacted.

10. The system of claim 9, wherein the second tier crash processor only performs the second level symbolication operation only if an application symbol map is accessible in a storage.

11. The system of claim 1 further comprising a set of web-portal servers to provide the at least one crash report to the application developer.

12. The system of claim 1 further comprising a set of storage servers for storing data processed by the plurality of different crash processors.

13. A system comprising:
   a plurality of crash processing servers, each including at least one crash processor in a plurality of different crash processors; and
   an application programming interface (API) server that receives, from a plurality of different mobile devices, raw crash logs and facilitates in assigning each crash log to one of the plurality of different crash processors;
   wherein a particular crash processor identifies an error specified in a particular crash log and stores the particular crash log in order to provide at least one crash report that presents the total number of occurrences of the error along with the particular crash log.

14. The system of claim 13 wherein each mobile device of the plurality of different mobile devices includes an application with an application monitor for reporting each detected application crash to the API server.

15. The system of claim 14, wherein the application monitor is further for reporting a state of a mobile device at a time of a crash along with a detected application crash.

16. The system of claim 15, wherein the API server facilitates in assigning a specific crash log to one of the plurality of different crash processors by adding the specific crash log to a task queue.

17. The system of claim 16, wherein the task queue is implemented by a message queue bus that distributes each crash log to one of the plurality of different crash processors.

18. The system of claim 13, wherein at least one crash processor in the plurality of different crash processors is for performing a symbolication operation to provide one or more symbol names for a particular raw crash log.

19. The system of claim 13, wherein at least one crash processor in the plurality of different crash processors is for performing a mapping operation to de-obfuscate obfuscated data in a particular raw crash log.

20. The system of claim 13 further comprising a set of web-portal servers to provide the at least one crash report to an application developer.

\* \* \* \* \*